(12) United States Patent
Girtman et al.

(10) Patent No.: US 10,233,038 B2
(45) Date of Patent: Mar. 19, 2019

(54) CARTON UNLOADER WITH SELF-ALIGNING INTERFACE

(71) Applicant: Intelligrated Headquarters, LLC, Mason, OH (US)

(72) Inventors: Michael L. Girtman, O'Fallon, MO (US); Nathan Blough, O'Fallon, MO (US); Dean Roper, O'Fallon, MO (US); Steven W. Griggs, St. Charles, MO (US); John Simons, St. Louis, MO (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 15/980,195

(22) Filed: May 15, 2018

(65) Prior Publication Data

US 2018/0257878 A1 Sep. 13, 2018

Related U.S. Application Data

(63) Continuation of application No. 15/344,183, filed on Nov. 4, 2016, now Pat. No. 10,005,627, which is a
(Continued)

(51) Int. Cl.
*G06F 7/00* (2006.01)
*B65G 59/02* (2006.01)
(Continued)

(52) U.S. Cl.
CPC ............ *B65G 59/02* (2013.01); *B25J 9/0093* (2013.01); *B25J 13/089* (2013.01); *B65G 37/00* (2013.01);
(Continued)

(58) Field of Classification Search
None
See application file for complete search history.

(56) References Cited

U.S. PATENT DOCUMENTS 5,944,469 A 8/1999 Theurer et al.
9,393,686 B1 7/2016 Bradski et al.
(Continued)

FOREIGN PATENT DOCUMENTS

WO WO 2008/153757 A1 12/2008

OTHER PUBLICATIONS

U.S. Appl. No. 15/344,183, filed Nov. 4, 2016, 2017/0121134 A1, Allowed.
(Continued)

*Primary Examiner* — Yolanda R Cumbess
(74) *Attorney, Agent, or Firm* — Alston & Bird LLP

(57) ABSTRACT

A self-aligning interface (6300) is attached to a robotic carton unloader (6100) and provides an interface between an extendable conveyor (6200) and the robotic carton unloader (6100). The self-aligning interface (6300) can include a positional measurement device (6320, 6320b, 6320c) mounted on the robotic carton unloader (6100) and operatively engaged with the extendable conveyor (6200) to provide positional information about the location of the extendable nose conveyor (6220) relative to the positional measurement device (6320, 6320b, 6320c). A control unit (6180) is attached to the robotic carton unloader (6100) for full robotic control of robotic carton unloader (6100) and the unloading process. The control unit (6180) is connected to the positional measurement device (6320, 6320b, 6320c) and the extendable conveyor (6200). The control unit (6180) uses positional information to calculate and control extension and retraction movements of the extendable conveyor (6200) in unison with the forward and reverse movements of
(Continued)

the robotic carton unloader 6100 to ensure unloaded cartons (12) exiting the moving truck unloader are received on the extendable conveyor (6200).

17 Claims, 12 Drawing Sheets

Related U.S. Application Data continuation-in-part of application No. 14/471,795, filed on Aug. 28, 2014, now Pat. No. 9,555,982.

(60) Provisional application No. 62/369,435, filed on Aug. 1, 2016, provisional application No. 62/251,036, filed on Nov. 4, 2015, provisional application No. 62/023,068, filed on Jul. 10, 2014, provisional application No. 61/973,188, filed on Mar. 31, 2014, provisional application No. 61/971,463, filed on Mar. 27, 2014, provisional application No. 61/916,720, filed on Dec. 16, 2013, provisional application No. 61/894,889, filed on Oct. 23, 2013, provisional application No. 61/894,871, filed on Oct. 23, 2013, provisional application No. 61/894,878, filed on Oct. 23, 2013, provisional application No. 61/871,292, filed on Aug. 28, 2013.

(51) Int. Cl.
| | | |
|---|---|---|
| *B25J 9/00* | (2006.01) | |
| *B25J 13/08* | (2006.01) | |
| *B65G 61/00* | (2006.01) | |
| *G05B 15/00* | (2006.01) | |
| *B65G 37/00* | (2006.01) | |
| *B65G 21/10* | (2006.01) | |
| *B65G 67/08* | (2006.01) | |

(52) U.S. Cl.
CPC ............ *B65G 61/00* (2013.01); *G05B 15/00* (2013.01); *B65G 21/10* (2013.01); *B65G 67/08* (2013.01); *Y10S 901/01* (2013.01); *Y10S 901/02* (2013.01); *Y10S 901/15* (2013.01); *Y10S 901/27* (2013.01)

(56) References Cited

U.S. PATENT DOCUMENTS

| | | | |
|---|---|---|---|
| 9,396,686 B2 * | 7/2016 | Ito | ............... G09F 13/005 |
| 2002/0094258 A1 | 7/2002 | Iwasaki et al. | |
| 2005/0131645 A1 | 6/2005 | Panopoulos | |
| 2014/0183980 A1 * | 7/2014 | Maeda | ............ H02K 5/128 |
| | | | 310/12.11 |
| 2015/0063973 A1 | 3/2015 | Girtman et al. | |
| 2016/0266578 A1 | 9/2016 | Douglas et al. | |
| 2017/0096308 A1 | 4/2017 | Girtman et al. | |
| 2017/0107055 A1 | 4/2017 | Magens et al. | |
| 2017/0248966 A1 | 8/2017 | Lutz et al. | |

OTHER PUBLICATIONS

U.S. Appl. No. 14/471,795, filed Aug. 28, 2014, U.S. Pat. No. 9,555,982, Issued.
International Search Report and Written Opinion of International Searching Authority for International Patent Application No. PCT/US2016/060635 dated Mar. 7, 2017, 10 pages.
International Search Report and Written Opinion of International Searching Authority for International Patent Application No. PCT/US2017/042031 dated Nov. 3, 2017, 11 pages.
International Search Report and Written Opinion of International Searching Authority for International Patent Application No. PCT/US2017/042033 dated Oct. 27, 2017, 11 pages.
Notice of Allowance for U.S. Appl. No. 15/344,183 dated Feb. 16, 2018
Notice of Allowance for U.S. Appl. No. 15/351,960 dated Apr. 20, 2017, 10 Pages.
Notice of Allowance for U.S. Appl. No. 15/587,549 dated Oct. 6, 2017, 8 pages.
Office Action for U.S. Appl. No. 15/344,183 dated Sep. 21, 2017
Office Action for U.S. Appl. No. 15/587,549 dated Sep. 20, 2017, 8 pages.

\* cited by examiner

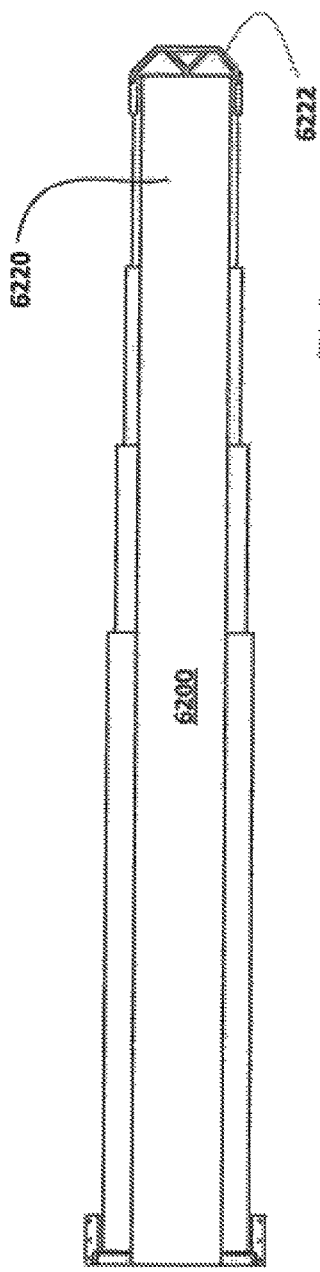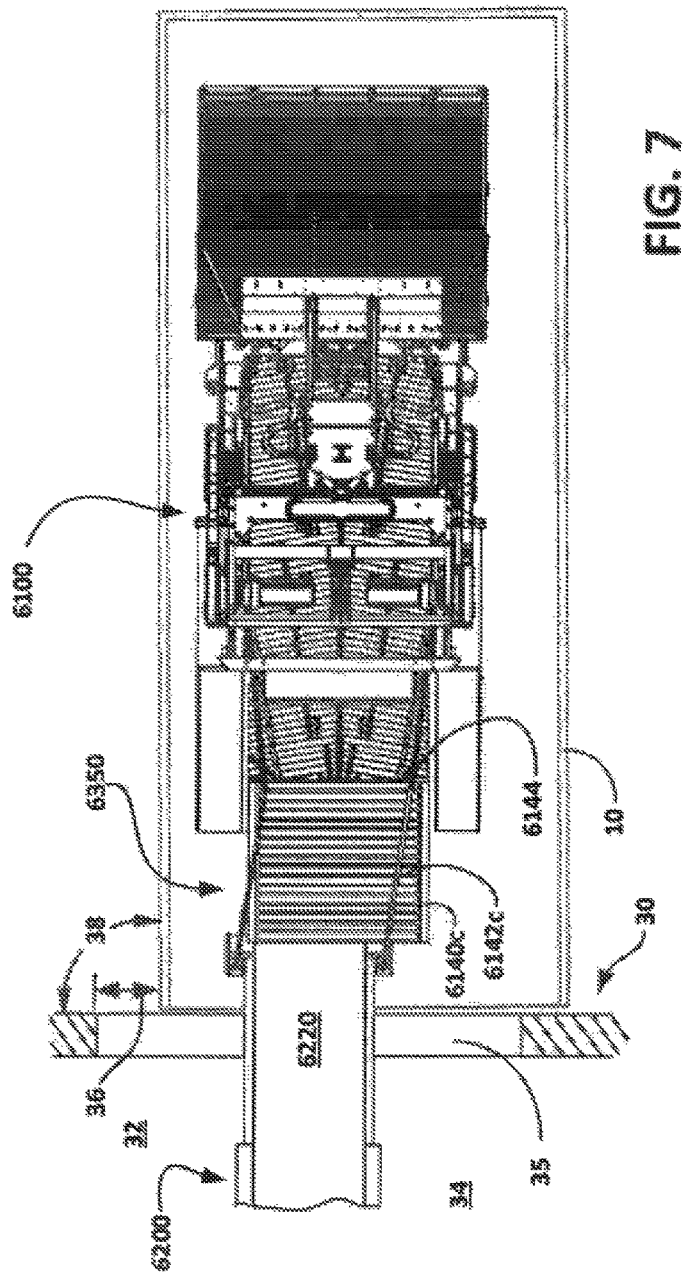

CARTON UNLOADER WITH SELF-ALIGNING INTERFACE

RELATED APPLICATIONS

This application is a continuation of U.S. patent application Ser. No. 15/344,183, filed Nov. 4, 2016, entitled "Carton Unloader with Self-Aligning Interface", which claims priority to U.S. Provisional Patent Application Ser. No. 62/369,435, filed Aug. 31, 2016, entitled "AUTONOMOUS CONTROLS FOR A ROBOTIC CARTON UNLOADER", and U.S. Provisional Patent Application Ser. No. 62/251,036, filed Nov. 4, 2015, entitled "TRUCK UNLOADER SELF ALIGNING INTERFACE", the entire contents of which are incorporated by reference herein.

U.S. patent application Ser. No. 15/344,183, filed Nov. 4, 2016, entitled "Carton Unloader with Self-Aligning Interface", of which this application is a continuation, is a continuation-in-part of, and claims priority to, U.S. Non-Provisional patent application Ser. No. 14/471,795, filed Aug. 28, 2014, entitled "Robotic Carton Unloader" which claims priority to U.S. Provisional Patent Application Ser. No. 61/871,292, filed Aug. 28, 2013, entitled "Robotic Carton Unloader", U.S. Provisional Patent Application Ser. No. 61/894,871, filed Oct. 23, 2013, entitled "Robotic Carton Unloader", U.S. Provisional Patent Application Serial No. 61/894,878, filed Oct. 23, 2013, entitled "Robotic Carton Unloader", U.S. Provisional Patent Application Ser. No. 61/894,889, filed Oct. 23, 2013, entitled "Robotic Carton Unloader", U.S. Provisional Patent Application Ser. No. 61/916,720, filed Dec. 16, 2013, entitled "Robotic Carton Unloader", U.S. Provisional Patent Application Ser. No. 61/971,463, filed Mar. 27, 2014, entitled "Robotic Carton Unloader", U.S. Provisional Patent Application Ser. No. 61/973,188, filed Mar. 31, 2014, entitled "Robotic Carton Unloader", and U.S. Provisional Patent Application Ser. No. 62/023,068, filed Jul. 10, 2014, entitled "Robotic Carton Unloader". The entire contents of all applications are incorporated by reference herein.

TECHNICAL FIELD

The present disclosure relates generally to an apparatus for handling products, and is more particularly directed to an automatic case unloader designed to unload product, such as cardboard cases of various sizes, from within a trailer.

BACKGROUND

Trucks and trailers loaded with cargo and products move across the country to deliver products to commercial loading and unloading docks at stores, warehouses, and distribution centers. Trucks can have a trailer mounted on the truck, or can be of a tractor-semi trailer configuration. To lower overhead costs at retail stores, in-store product counts have been reduced, and products-in-transit now count as part of available store stock. Unloading trucks quickly at the unloading docks of warehouses and regional distribution centers has attained new prominence as a way to refill depleted stock.

Trucks are typically unloaded with forklifts if the loads are palletized and with manual labor if the products are stacked within the trucks. Unloading large truck shipments manually with human laborers can be physically difficult, and can be costly due to the time and labor involved. Consequently, a need exists for an improved unloading system that can unload bulk quantities of stacked cases and cargo from truck trailers more quickly than human laborers and at a reduced cost.

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

BRIEF SUMMARY

In one aspect of the subject innovation, a self-aligning interface is provided for interfacing an extendable conveyor attached to a floor of a warehouse to a robotic carton unloader when a robotic carton unloader is within a semi-trailer to unload cartons. The extendable conveyor has an extendable nose conveyor to receive unloaded cartons thereon from the robotic carton unloader during the unloading process. A positional measurement device is mounted on the robotic carton unloader and operatively engaged with the extendable conveyor to provide positional information about the location of the extendable nose conveyor relative to the positional measurement device. A control unit is attached to the robotic carton unloader for robotic control of robotic carton unloader and the unloading process. The control unit operably connects to the positional measurement device and communicably connects to the extendable conveyor. The control unit (6180) uses the positional information to calculate and control extension and retraction movements of the extendable conveyor to move in unison with the forward and reverse movements of the robotic carton unloader.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE FIGURES

FIG. 6 illustrates a top view of the extended extendable conveyor of FIG. 3;

FIG. 7 illustrates a top section view of the truck trailer of FIG. 3 showing lateral and angular misalignment of the truck trailer with the loading dock and the extended extendable conveyor, and with the interface of the carton unloader self-aligned to one side to align with the extended extendable conveyor;

DETAILED DESCRIPTION

Figure 1:
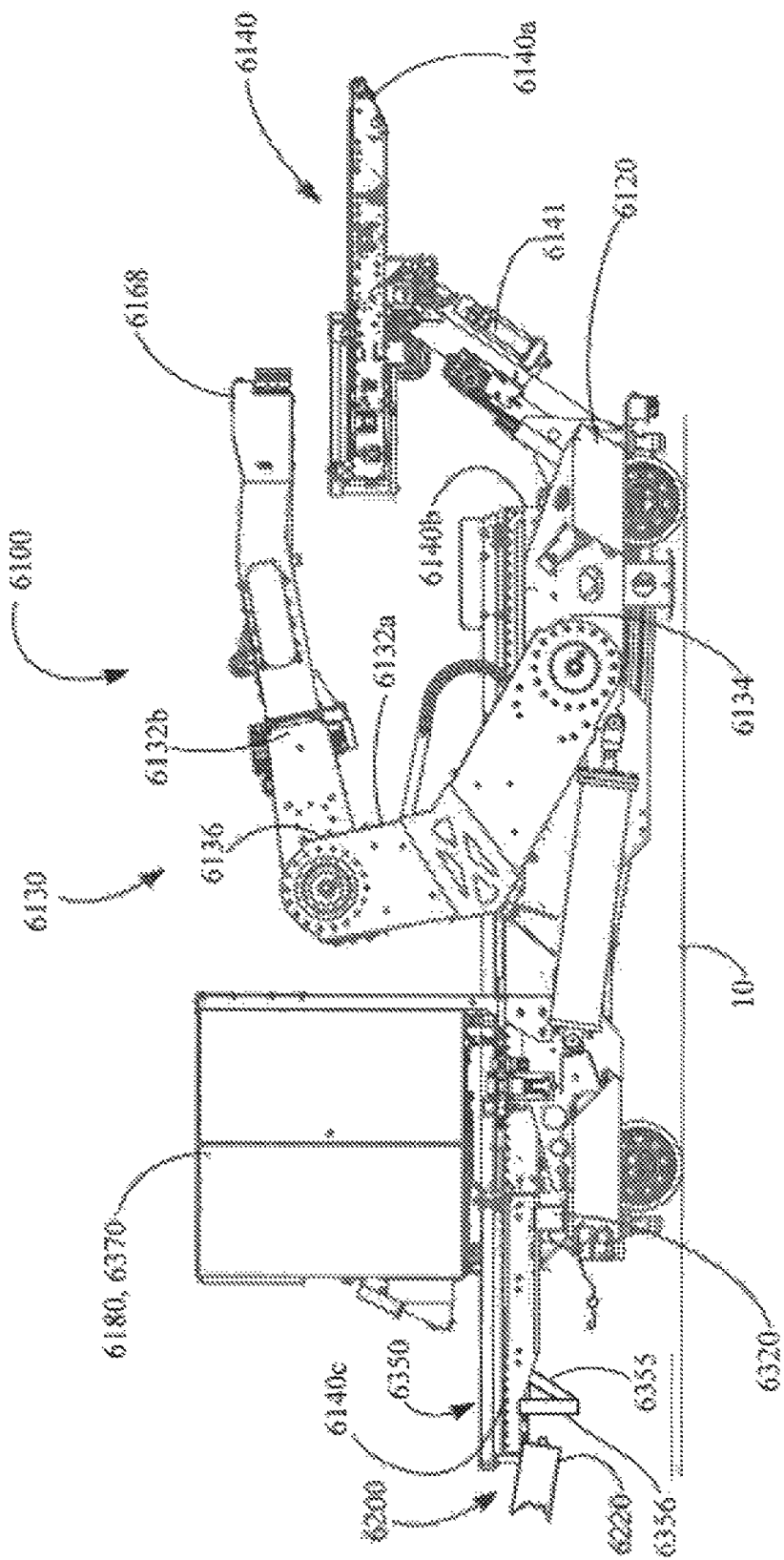
FIG. 1 illustrates a side view of a carton unloader with a self-aligning interface.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Referring initially to the drawings, FIGS. 1-17 illustrate an alternate embodiment of a robotic carton unloader 6100 for unloading a container, truck, or semi-trailer 10. The robotic carton unloader 6100 includes a control unit or control and visualization system 6180 including a processor and attached to the robotic carton unloader 6100 for autonomous robotic control of robotic carton unloader 6100. Control and visualization system 6180 can control the unloading process without human intervention. The robotic carton unloader 6100 may include an interface or self-aligning interface 6300 of the present innovation to interface with an extendable conveyor 6200 shown mounted to a floor 34 of a warehouse 30 in FIG. 3. The self-aligning interface 6300 can include positional measurement device 6320 mounted on the robotic carton unloader 6100 to operatively engage with the extendable conveyor 6200 to provide positional information about extendable nose conveyor 6220 of the extendable conveyor 6200 relative to the positional measurement device on the robotic carton unloader 6100. The self-aligning interface 6300 can include the visualization and control system 6180 which can operably connect to the positional measurement device 6320 and communicably connect to the extendable conveyor 6200. The control unit 6180 may use the positional information to extend the extendable conveyor 6200 to a position to receive unloaded cartons 12 thereon, and may calculate and control extension and retraction movements of the extendable conveyor 6200 to move in unison with the forward and reverse movements of the robotic carton unloader 6100.

Figure 3:
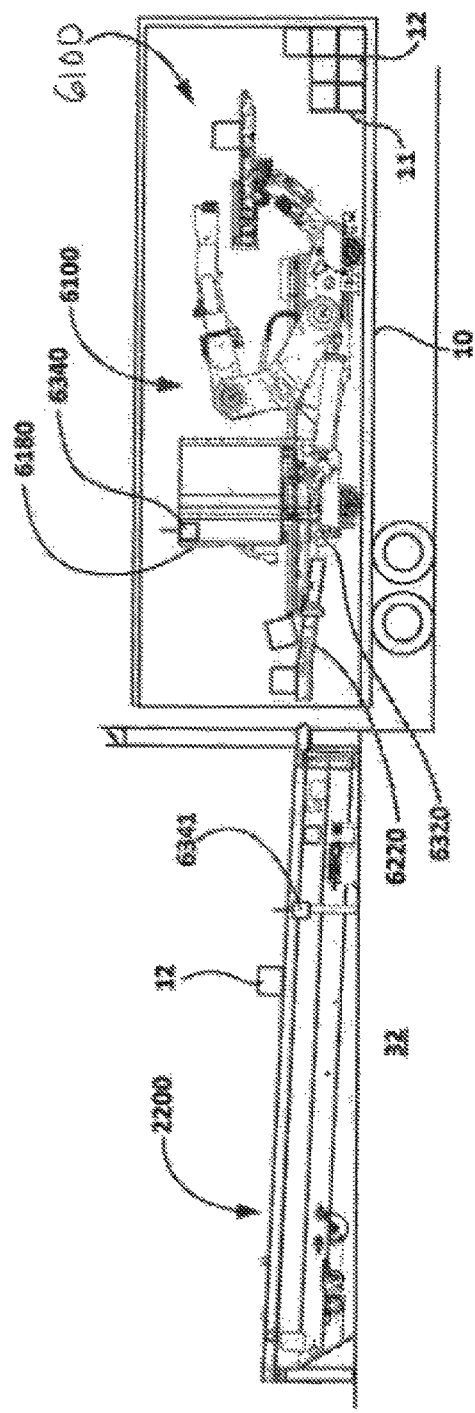
FIG. 3 illustrates a partial sectioned side view of a truck trailer with the carton unloader of FIG. 1 positioned within, and with the carton unloader interfacing with an extended extendable conveyor.
Figure 4:
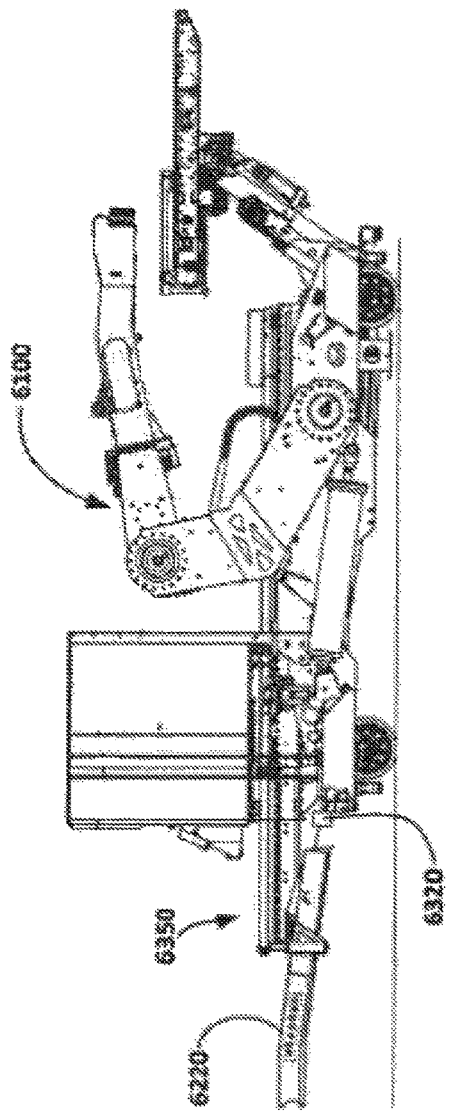
FIG. 4 illustrates an enlarged partial side view of the carton unloader of FIG. 3 interfacing with the extended extendable conveyor.

The self-aligning interface 6300 can include a carton alignment interface 6350 that mechanically engages with the extendable nose conveyor 6220 to laterally guide unloaded cartons exiting the robotic carton unloader 6100 onto the extended nose conveyor 6220. Carton alignment interface 6350 can readjust during the unloading process. The control unit or control and visualization system 6180 may interface the extendable conveyor 6200 to the robotic carton unloader 6100 to receive unloaded cartons onto the extendable conveyor 6200, and control unit 6180 may continually maintain this carton receiving relationship to provide a continuous flow of cartons 12 from the robotic carton unloader 6100 onto extendable conveyor 6200 throughout the unloading of the semi-trailer 10. The control and visualization system 6180 of the self-aligning interface 6300 can maintain this carton receiving relationship relative to the robotic carton unloader 6100 during the unloading process by calculating and communicating extension and retraction movements to the extendable nose conveyor 6220 to synchronize with forward and backward movements the robotic carton unloader 6100 during the unloading process. Extendable conveyor 6200 is depicted in FIG. 3 as a fully powered telescopic or extendable conveyor mounted to the floor 34 of the loading dock 32, but is not limited thereto.

The automated features of the self-aligning interface 6300 operate without human intervention, can ensure that the extendable conveyor 40 and the carton unloader 20 provide a continuous unbroken conveying path between the robotic carton unloader 6100 and the extendable conveyor 6200, can ensure that cartons 12 do not fall into a gap between the carton unloader 20 and the extendable conveyor 6200, and can ensure a constant uninterrupted flow of cartons 12 onto the extendable conveyor 6200. The self-aligning interface 6300 can also include a carton alignment interface 6350 attached to a rear of the robotic carton unloader 6100 configured to reposition from contact with the extendable nose conveyor 6220 to laterally redirect unloaded cartons 12 exiting a rear of the robotic carton unloader 6100. Carton alignment interface 6350 automatically compensates for lateral or angular misalignment between the extendable nose conveyor 6220 of the extendable conveyor 40 and a rear of the carton unloader 6200 by laterally adjusting a discharge or exit path of the cartons 12 discharging from a rear of the robotic carton unloader 6100 (see FIGS. 7-10). Each element of the self-aligning interface 6300 can work in unison to address a different problem and can ensure that a steady flow of cartons 12 will exit from the robotic carton unloader 6100 and can be received onto the extendable conveyor 6200.

Embodiments of robotic carton unloader 6100 can include embodiments described in co-pending parent U.S. application Ser. No. 14/471,795, entitled "Robotic Carton Unloader" filed Aug. 28, 2014, the entire contents of which are hereby incorporated by reference in their entirety. The self-aligning interface 6300 described in detail below is not limited to use with the robotic carton unloader 6000 and could be adapted for use with other robotic carton unloaders.

In embodiments, the self-aligning interface 6300 can comprise positional measurement device 6320, 6320b, or 6320c mounted on the robotic carton unloader 6100 and operatively engaged with the extendable conveyor 6200 to provide positional information about the location of the extendable nose conveyor 6220 relative to the positional measurement device 6320, 6320b, 6320c on the robotic carton unloader 6100. The self-aligning interface 6300 may include control unit 6180 attached to the robotic carton unloader 6100 for robotic control of robotic carton unloader 6100 and the unloading process. The control unit 6180 may be operably connected to the positional measurement device 6320, 6320b, 6320c and communicably connected to the extendable conveyor 6200. The control unit 6180 may use the positional information to calculate and control extension and retraction movements of the extendable conveyor 6200 in unison with the forward and reverse movements of the robotic carton unloader 6100.

Robotic carton unloader 6100 can unload cartons 12 from within a store, distribution center, or warehouse 30, and from the container, truck, or semi-trailer 10. The term "robotic" of the robotic carton unloader 6100 may mean completely autonomous operation without human intervention. A control unit or control and visualization system 6180 can include a processor, and be mounted on the robotic carton unloader 6100. The control and visualization system 6180 may visualize or sense the surroundings, may use the sensings to perform computations with the control and visualization system 6180 to identify and select cartons 12 for removal, use the computations from the control and visualization. system 6180 to move the robotic carton unloader 6100 into position, and use the computations from the control and visualization system 6180 to unload the selected cartons 12 without any human intervention. The control and visualization system 6180 can constantly re-sense and re-compute all autonomous actions necessary to unload an entire semi-trailer 10 from rear to front.

By way of example, the robotic carton unloader 6100 may, under the control of the control and visualization system 6180, operate without any human intervention as it moves from the warehouse 30, through a loading door 32, into the semi-trailer 10, unloads the cartons 12 within entire semi-trailer 10 from rear to front, and then exit from the semi trailer 10 back into the warehouse 30 to access another truck trailer 12 at the same or a different location. The control and visualization system 6180 can at least visualize or sense the warehouse 30, the loading door 32, the interior of the semi-trailer 10, a carton wall or carton pile 11 stacked on floor 18 of the semi-trailer 10, and individual cartons 12 of all sizes and shapes thereof, and can autonomously compute all movements necessary to move and steer the robotic carton unloader 6100 during the unloading process (See FIG. 3).

As shown in at least FIGS. 1-4, the robotic carton unloader 6100 can be characterized as follows. Robotic carton unloader 6100 can unload a carton pile 11 resting on a floor 18, e.g. within a truck, warehouse, container or semi-trailer 10. The control and visualization system 6180 may be configured to operate the robotic carton unloader 6100, and to control and automate the unloading process by coordinating and controlling all of the functions of the systems of the robotic carton unloader 6100. Mobile body 6120 can carry the control and visualization system 6180 and may be driven and steered thereby. The conveyor system 6140, can be controlled by the control and visualization system 6180, to transport cartons 12 unloaded thereon, the conveyor system 6140 mounted on the mobile body 6120 and fixed thereto to extend from a front to a rear of the robotic carton unloader 6100. A robotic arm 6130 can be controlled by the control and visualization system 6180 and may be configured to attach to the mobile body 6120 to straddle the conveyor system 6140 on sides thereof so that cartons 12 may pass through pivotable sides thereof.

Figure 2:
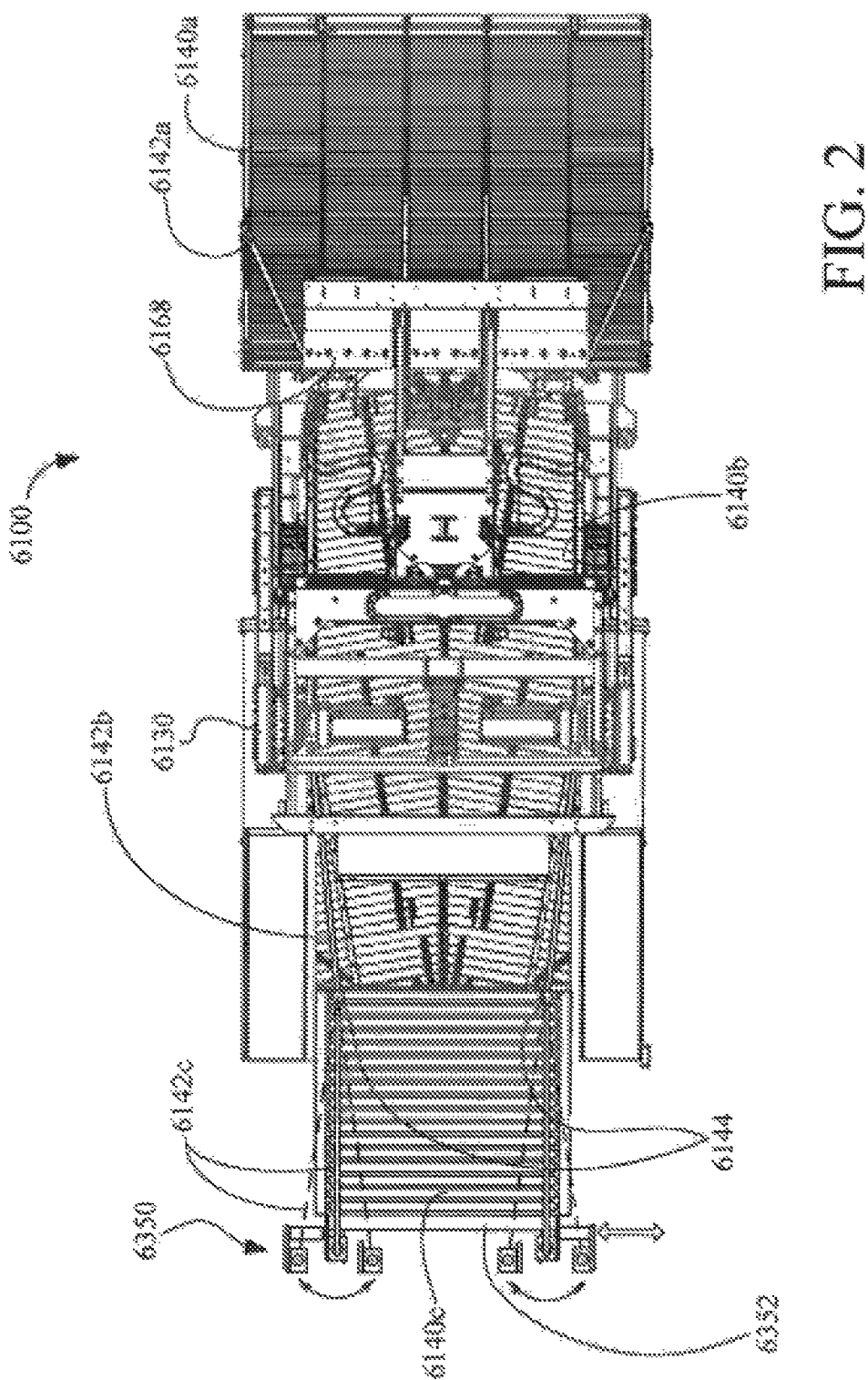
FIG. 2 illustrates a top view of the carton unloader of FIG. 1.

The carton retrieval robotic arm 6130 may comprise a pair of pivoting arms 6132a, 6132b with lower arm 6132a having a first end pivotally attached to a side of the mobile body 6120, at lower arm axis 6134, a second end that pivotally attached to upper arm 6132b at upper arm axis 6136 with the upper arm 6132b pivotally extending from the second end of the lower arms 6132a to rotate around the upper arm axis 6136, and a vacuum manipulator 6138 may be pivotally attached to pivotable ends of the upper arm portion 6132b to pivot around head pivot axis D-D (see FIG. 2).

Control and visualization system 6180 may include various visualization sensors (e.g., cameras, etc.), operator interfaces (e.g., joysticks, pendants, displays, keypads, etc.), and processors, and may be capable of controlling and automating the unloading process, and driving and steering the robotic carton unloader 3500 into and out of unloading areas (e.g., semi-trailers) before, during, and after the unloading process. The control and visualization system 6180 can be used to compute the location of the wall of carton piles 11 relative to robotic carton unloader 6100 and the manipulator 6168 and can autonomously control and move the robotic arm 6130 to unload of cartons 12 from the carton pile 11 and place the unloaded cartons 12 onto the unloader conveyor system 6140 for conveyance onto the extendable conveyor 6200.

Robotic carton unloader 6100 in embodiments may include robotic arms (or robotic carton retrieval arms) that may be of a straddle design and include end effectors (e.g., vacuum manipulators) for retrieving items (e.g., cartons from a carton pile), conveyor systems (e.g., a descrambling conveyor), and mobile (or vehicle) bodies. Such embodiment robotic carton unloaders may be suitable for efficient and fast unloading of items (e.g., cartons, cardboard boxes, any kind of product container for conveying products, etc.) from unloading areas, such as a truck (or semi) trailer, refrigerated areas, loading docks, etc. For example, a robotic carton unloader according to various embodiments may be configured to drive into a semi-trailer via its mobile body, to dislodge or remove cartons from a carton wall or carton pile stacked on a floor of the semitrailer via its end effector (e.g., manipulator head) coupled to the robotic arm, and to transfer or unload the dislodged cartons from the semi-trailer and into a store, warehouse, or distribution center unloading bay via its conveyor system that travels with the mobile body and outputs the cartons to other conveyors. Such embodiment robotic carton unloaders 100 may be capable of removing a substantial portion of a row of items (e.g., a carton row) that extends side-to-side across an unloading area (e.g., semi-trailer) with one removal action. For example, such robotic carton unloaders 100 may be configured to remove between about 40% to about 100% of a carton row in one movement. Designed to move within space-constrained unloading areas, such embodiment robotic carton unloaders 100 may minimize the time and effort required to efficiently unload and provide basic organization for items being moved for subsequent processing within facilities, such as distribution centers. Alternately, the robotic arm 6130 in embodiments may be a conventional robotic arm by way of an example a FANUC Robot R-1000ia sold by Fanuc Robotics America Corporation described in and shown in FIGS. 1-4 of parent U.S. application Ser. No. 14/471,795.

As shown in the side view of the robotic carton unloader 6100 of FIG. 1 and top view of FIG. 2, the descrambler or unloader conveyor or conveyor system 6140 extends from front to rear of the robotic carton unloader 6100, and can include an independently movable front conveyor portion 6140a mounted on a pedestal 6141. Pedestal 6141 can raise and lower the front conveyor portion 6140a, can tilt a front of the front conveyor portion 6140 up and down, can slide the front portion 6140a laterally from side to side, and can extend and retract to move the front conveyor portion into position to receive articles unloaded from the carton pile 11 by the robotic arm 6130. A center conveyor portion 6140b is attached across a top of the mobile body 6120 to convey and descramble cartons 12 conveyed thereon. A rear conveyor portion 6140c extends rearwards to define a rear of the robotic carton unloader 6100, and is configured to interface with the extendable conveyor 6200.

In FIGS. 1-3, the self-aligning interface 50 comprises front guide rails 27 suspended above the center conveyor 26b that funnel down to a narrow point or throat 27a. at the transition onto the rear conveyor 26c. Articles 35 moving rearwards along the center conveyor 26h are biased inwardly by contact with the front guide 27 to emerge from the throat 27a at a center of the rear conveyor 26c. Rear conveyor 26c of forms a portion of the self-aligning interface 50 and extends from a rear of the robotic carton unloader 20 with an overhang that extends over the extendable conveyor 40 when interfaced (see FIGS. 3-5 and 7-10).

Raised conveyor guides 6142 extend along sides of the conveyor system 6140 above a conveying surface thereof to guide cartons 12 moving front to rear along the unloader conveyor system 6140 (see FIGS. 1-10). The front conveyor portion 6140a has angled front guides 6142a to funnel rearward moving cartons 12 inwards towards a center of the front conveyor portion 6140b. Center conveyor portion 6140b has angled center guides 6142c that funnel down to a narrow point or throat 6144 at the transition onto rear conveyor portion 6140c. Cartons 12 moving rearwards along the center conveyor portion 6140b are biased inwardly by contact with the center guides 6142c to emerge from the throat 6144 onto a center of the rear conveyor portion 6140c, Rear conveyor portion 6140c extends from a rear of the robotic carton unloader 6100 with an overhang that extends over the extendable conveyor 6200 when interfaced (see FIGS. 3-5 and 7-10). Carton alignment interface (6350) attaches to a rear of the robotic carton unloader 6100 and can be configured to reposition from contact with the extendable nose conveyor 6220 to laterally redirect unloaded cartons 12 exiting a rear of the robotic carton unloader 6100 onto the extendable nose conveyor 6220. Carton alignment interface 6350 may attach to rear conveyor portion 6140c.

Carton alignment interface 6350 (see FIGS. 1-5) can comprise a sliding bar 6352 slidingly mounted at a rear of rear conveyor portion 6140c to move laterally to either side on slides 6354. Roller bracket 6355 extends downwards from sliding bar 6352 on each side to rotatably support a roller 6356 on each side. Rollers 6356 are spaced apart to receive extendable nose conveyor 6220 in between and to rotate as extendable nose conveyor 6220 extends therein. A pair of rear guides 6142c pivotally attach to the rear conveyor portion 6140c at throat 6144 with one on each side thereof to pivot around a vertical axis. Rear ends of rear guides 6142c pivotally attach at each end of sliding bar 6352 above rollers 6356 and are generally parallel as depicted in FIG. 2. As shown in FIG. 6, extendable conveyor 6200 has extendable nose conveyor 6220. An angled guide 6222 is attached at a front end of the extendable nose conveyor 6220. Angles of angled guide 6222 are configured to contact with rollers 6356 of the carton alignment interface 6350 as the extendable nose conveyor 6220 is extended and to bias the sliding bar 6352 to one side when a misaligned extendable nose conveyor extends in between rollers 6356 as shown in FIG. 7. Rollers 6356 and retractable cable 6322 described below may form the only physical connections between extendable conveyor 6200 and robotic carton unloader 6100.

In FIG. 7, the extendable conveyor 6200 is attached to the floor 34a of the warehouse 30 and the extendable nose conveyor 6220 is extended through loading door 35 into semi-trailer 10 and into engagement with carton alignment interface 6350. In FIG. 7, the semi-trailer is both shifted laterally to loading door 35 a distance 36 and at an angle 38 to the loading door 35 to show misalignments. Extendable conveyor 6200 is centered in the loading door 35, Angled guide 6222 of extendable conveyor nose 6220 has shifted the carton alignment interface 6350 laterally from the extendable conveyor 6200/ robotic carton unloader 6100 misalignment, and the rear guides 6142c pivot or swivel at throat 6144. When cartons 12 travel along rear conveyor portion 6140c, the rear guides 6142c guide or redirect the cartons onto extendable nose conveyor 6220 (FIG. 3).

Figure 8:
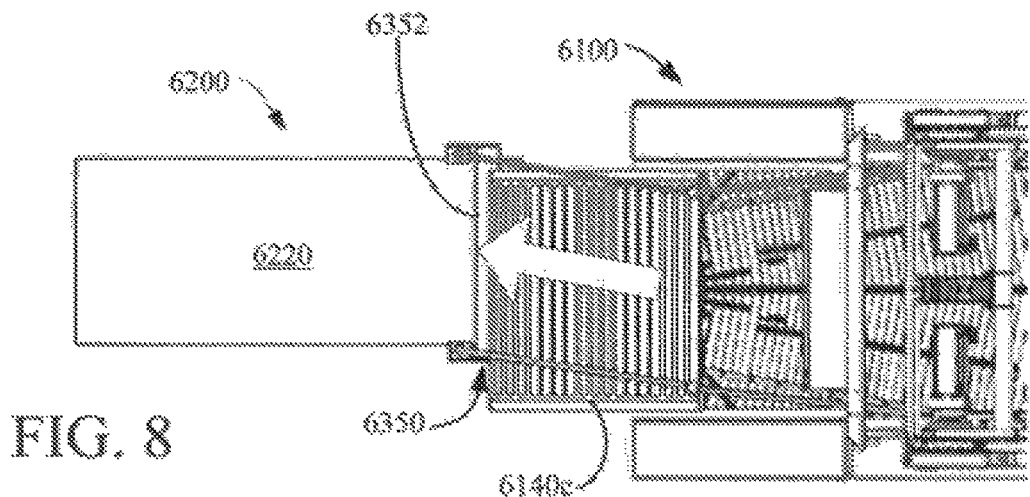
FIG. 8 is an enlarged partial top view of a rear portion of the carton unloader of FIG. 1 showing a carton unloader laterally misaligned in a first direction and interfacing with the extended portion of the extendable conveyor.
Figure 9:
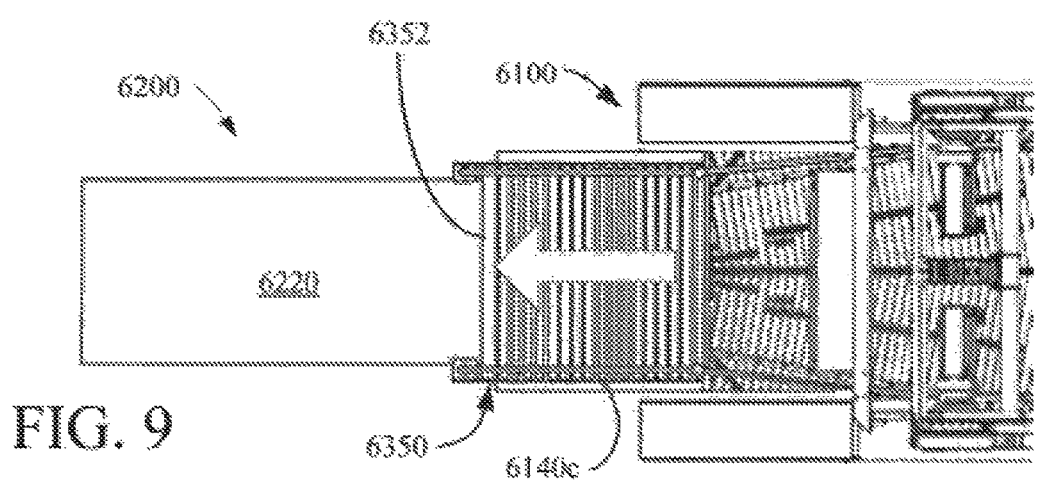
FIG. 9 is an enlarged partial top view of a rear portion of the carton unloader of FIG. 1 showing the carton unloader laterally aligned with the extendable conveyor in an extended position.
Figure 10:
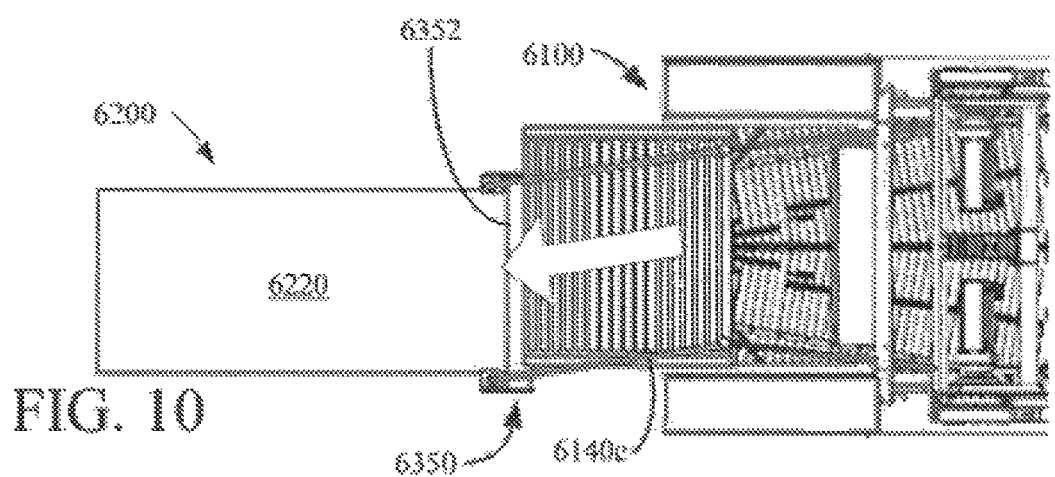
FIG. 10 is an enlarged partial top view of a rear portion of the carton unloader of FIG. 1 showing a carton unloader laterally misaligned in a second direction and interfacing with the extended portion of the extendable conveyor.
Figure 11:
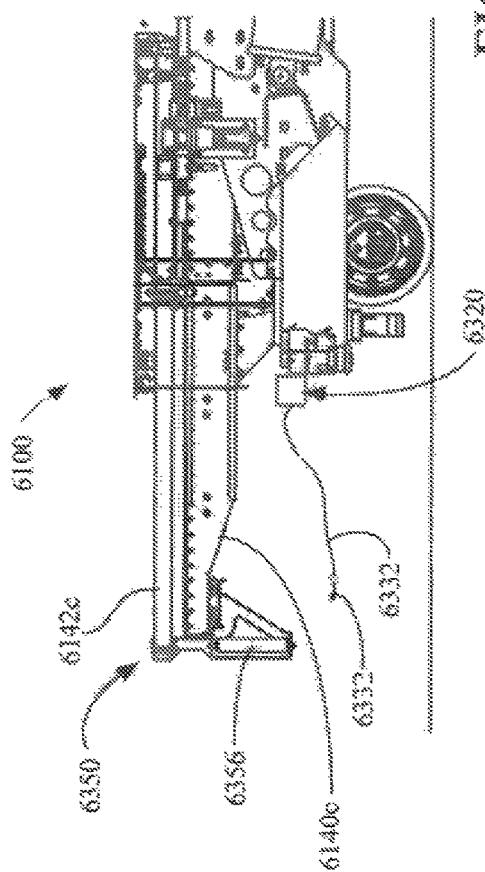
FIG. 11 is an enlarged side view of the self-aligning interface at the rear of the carton unloader showing a distance and measuring device attached thereto.

FIGS. 8-10 show three positions for carton alignment interface 6350 to be adjusted to from contact with the extendable conveyor 6220. FIG. 8 shows the carton alignment interface 6350 interfacing with extendable nose conveyor 6220 laterally redirected or biased to a first side. FIG. 9 shows the extendable nose conveyor 6220 aligned with the robotic carton unloader 6100 and with the carton alignment interface 6350 in an un-biased position. FIG. 10 shows carton alignment interface 6350 interfacing with extendable nose conveyor 6220 laterally redirected or biased to a second side. An arrow is provided on rear conveyor 6140c in each of FIGS. 8-10 to show the path followed by unloaded cartons conveyed on rear conveyor 6140c from the lateral redirection or bias from the rear guides 6142c.

Positional measurement device 6320 can be positioned at a rear of the robotic carton unloader 6100 and under the overhung rear conveyor portion 6140c as shown in FIGS. 1, 3, 4, 5, and 11 to measure distance and angular positions of one or more points on the extendable nose conveyor 6220 relative to the positional measurement device 6320. The positional information obtained with the positional measuring device 6320 can be used by the control and visualization system 6180 which, in the present embodiment, can be the control and visualization system 6180 autonomously controlling the robotic carton unloader 6100. Control unit 6180 may be attached to the robotic carton unloader 6100 and to the positional measurement device 6320 (described below) and communicably connected to the extendable conveyor 6200. Control unit 6180 can move the extendable nose conveyor 6220 into carton receiving alignment with the robotic carton unloader 6100. The control unit 6180 may be configured to receive positional information from the positional measurement device 6320 and to use the positional information to calculate and communicate synchronized extension and retraction movements to the extendable conveyor 6200 to maintain synchronized carton receiving alignment between the robotic carton unloader 6100 and the extendable conveyor 6200, Control and visualization system 6180 can use the positional information to calculate the synchronized receiving alignments as movements communicated to the extendable conveyor 2200 to extend and retract the extendable nose conveyor 6220 of the conveyor 40 in unison with the forward and reverse movements of the robotic carton unloader 20. The control unit 6180 can be attached to the robotic carton unloader 6100 for robotic control of robotic carton unloader 6100 and the unloading process. The control unit 6180 may be operably connected to the positional measurement device 6320, 6320b, 6320c and communicably connected to the extendable conveyor (6200) to control extension and retraction movements of the extendable conveyor (6200) in unison with the forward and reverse movements of the robotic carton unloader 6100.

Figure 5:
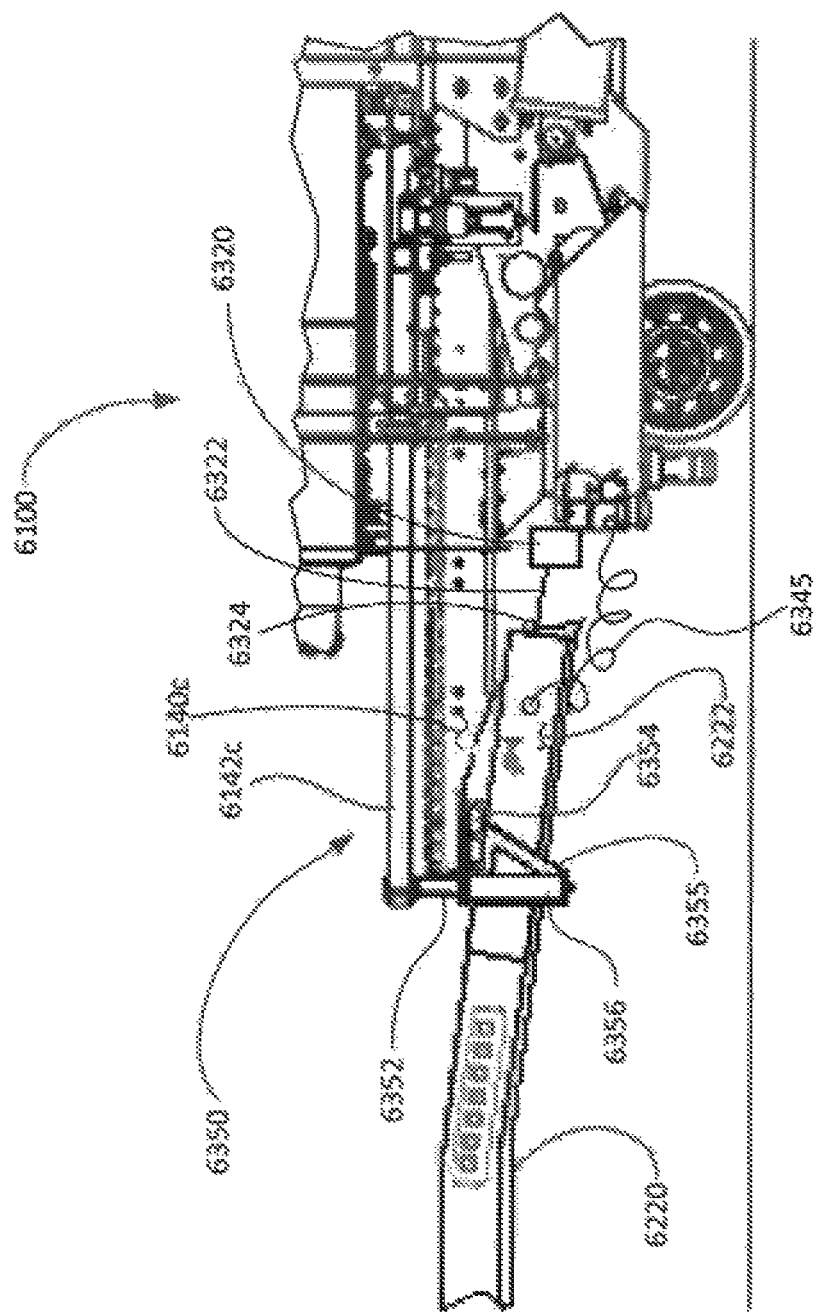
FIG. 5 illustrates an enlarged partial side view of the carton unloader and extended conveyor of FIG. 4 interfaced with the extendable conveyor and with a string encoder mounted on the carton unloader and connected to the extended extendable conveyor.

Communication between the carton unloader 6100 and the extendable conveyor 6200 can be through a communications link 6327 such as, but not limited to, a wireless system, laser, infrared, visible light, or an Ethernet cable. An example of a communications link 6327 can be seen in FIG. 3 with an unloader wireless unit 6340 on robotic carton unloader and an extendable wireless link 6340 on the extendable conveyor 6200. FIG. 5 shows by way of example, a cable such as an Ethernet cable 6345 linking the control and visualization system 6180 to the extendable conveyor 6200 to send extension and retraction commands thereto.

As depicted in FIGS. 12-18, the positional measurement device 6320 can include a retractable string or cable 6322 that can be used to measure distances and angular positions. Positional measurement devices 6320, 6320b, 6320c can be mounted on the robotic carton unloader 6100 and operatively engagable with the extendable conveyor 6200 to provide positional information about the extendable nose conveyor 6220 of the extendable conveyor 6200 relative to the positional measurement device 6320, 6320b, 6320c on the robotic carton unloader 6100.

The retractable cable 6322 can include an attachment member 6324 at a free end thereof that can attach to the extendable nose conveyor 6220 and can comprise a hook, a ring, a magnet, or any other attachment member 6324. In some embodiments, the attachment member 6324 can be curved or arcuate such as ring 6320 in FIG. 18 or hook 6324 in FIGS. 11 and 12. By way of an example, the attachment member can attach to a hole or ring in the extendable nose conveyor 6220 or angled guide 6222 of conveyor nose 6220.

Figure 12:
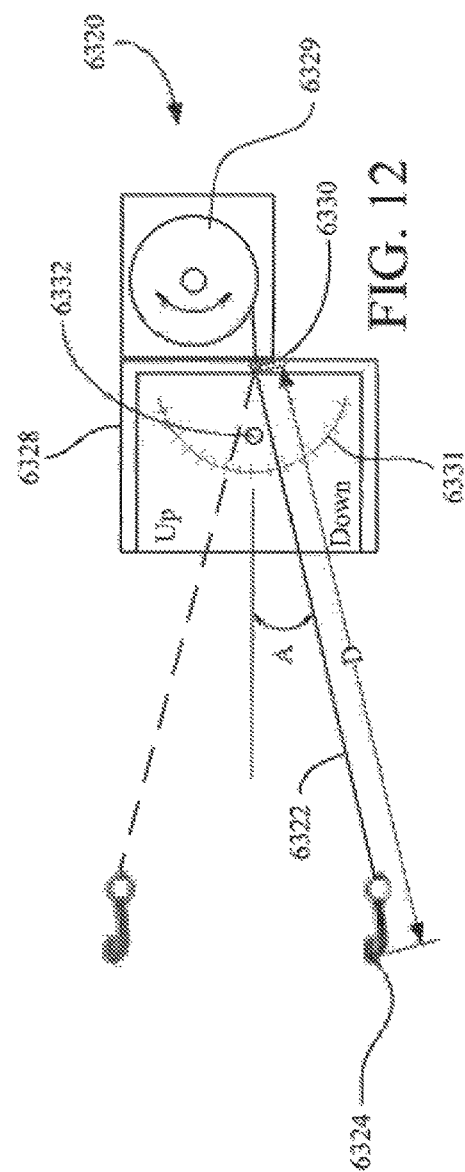
FIG. 12 is a top section view of a first embodiment of the distance measuring device.

As shown in the top sectional view of FIG. 12, a first embodiment of a positional measurement device 6320 can comprise a shield or shell 6328 that attaches under the overhung rear conveyor portion 6140c to protect the positional measurement device 6320. Shell 6328 can include an open side facing rearwards towards the extendable conveyor 6200 for the passage of the retractable cable 6322 therethrough and can include an open top. Retractable cable 6322 can wrap around take-up reel 6329 which can be configured to constantly retract retractable cable 6322. Retractable cable 6322 is fed from take-up reel 6329 through opening 6330. Attachment member 6324 is larger than opening 6330 to prevent retractable cable 6322 from being pulled through opening 6330. A vertical scale 6331 can be provided on the inside of the shell 6328 and vertical sensor 6332 can sense a vertical angular position of retractable cable 6322 up or down as an angle in degrees or radians such as angle "A". A cable extension distance "D" can be sensed by an encoder 6333 (see FIG. 13) on the take-up reel 6329. The cable extension distance "D" from encoder 6338 and angle "A" from sensor 6332 can be communicated to the control and visualization system 6180 for computational purposes. A retraction spring 6334 can be used to retract the retractable cable 6322 onto take-up reel 6329.

Figure 13:
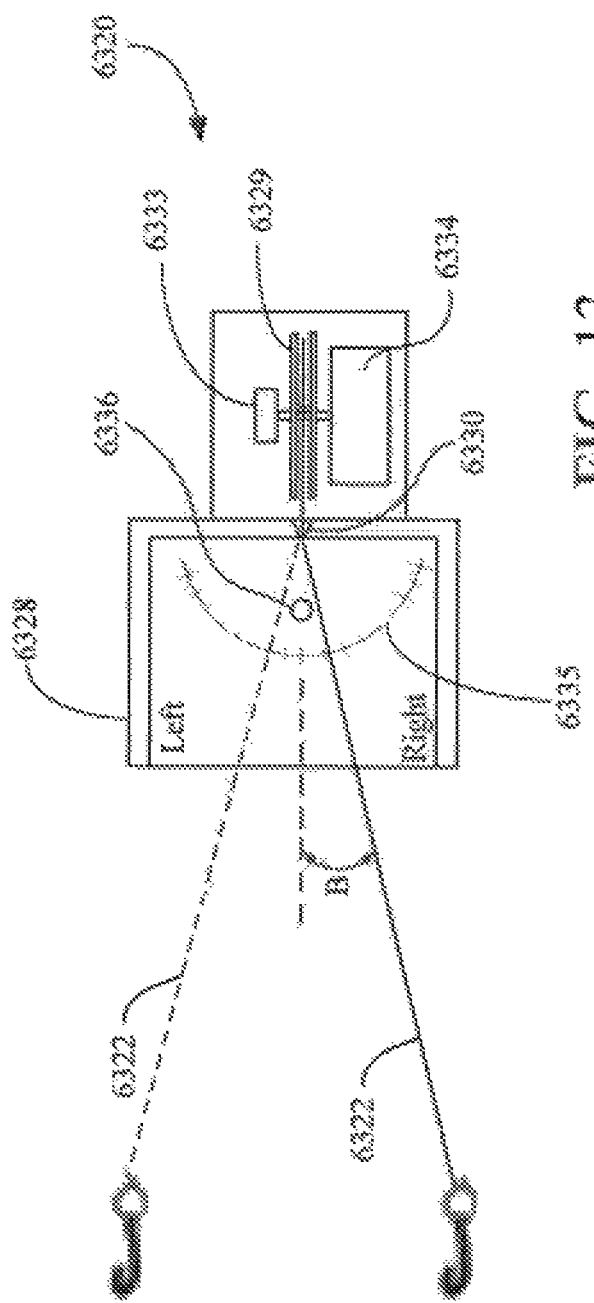
FIG. 13 is a side section view of a first embodiment of the distance measuring device.
Figure 14:
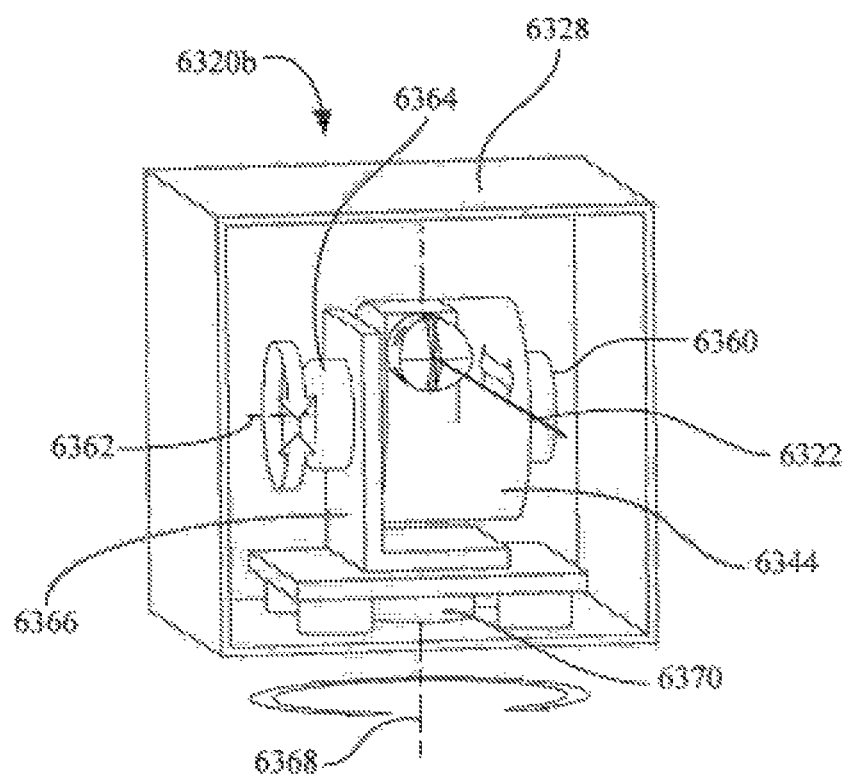
FIG. 14 is an isometric view into a protective shell surrounding a second embodiment of the distance measuring device.
Figure 15:
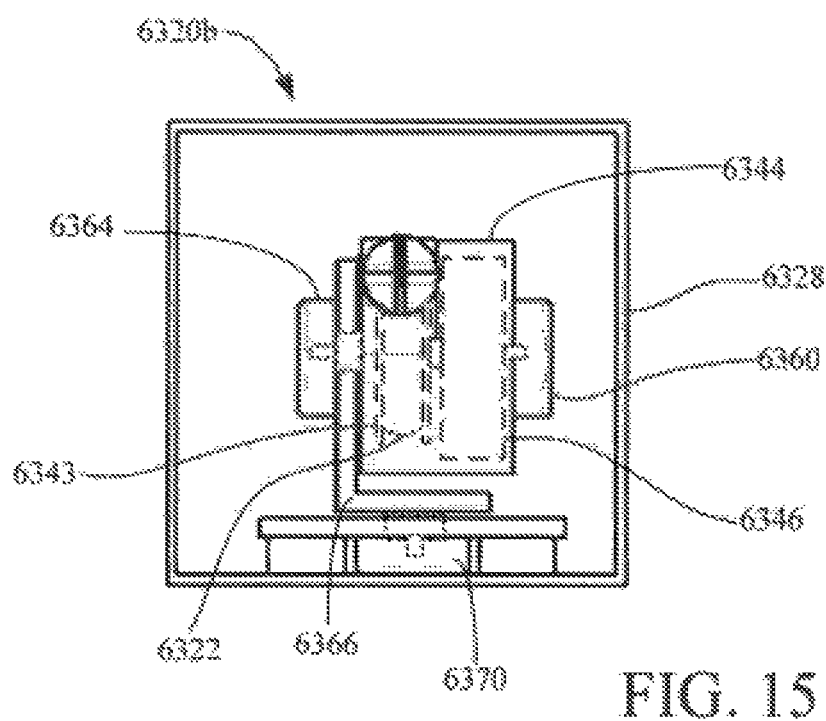
FIG. 15 is a rear view of the second embodiment of the distance measuring device FIG. 14 positioned to show encoders.

FIG. 13 is a side sectional view of shell 6328 showing a left and right measurement system. Retractable cable 6322 is shown extending from opening 6330 and is angled towards the "right" of horizontal scale 6335. Horizontal sensor 6336 can measure the horizontal B angle as degrees or radians and as a left or right angle and may communicate to the control and visualization system 6180 for computational purposes. Distance encoder 6333 can be seen operatively attached to take-up reel 6329 and to retraction spring 6334. Information from vertical sensor 6332, horizontal sensor 6336, and cable extension distance "D" from distance encoder 6333 provide 3-d information as to the location of the free end of the retractable cable 6322, and when attached to a known point on extendable conveyor 6200, the location of the extendable conveyor 6200 relative to the positional measurement device 6320.

Figure 16:
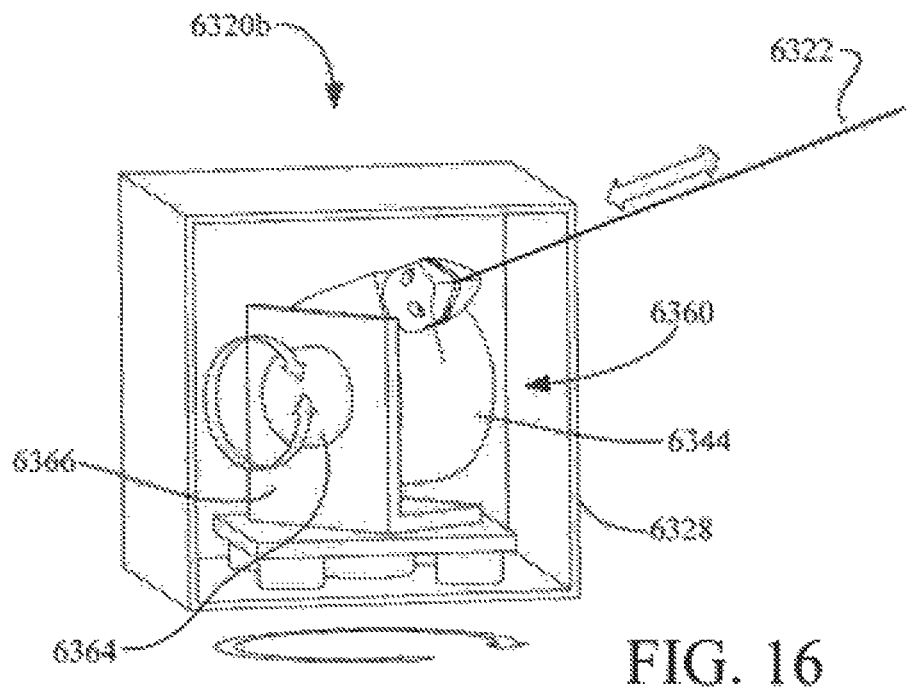
FIG. 16 is an isometric view of the second embodiment of the distance measuring device of FIG. 14 with the string pointing in a second direction.
Figure 17:
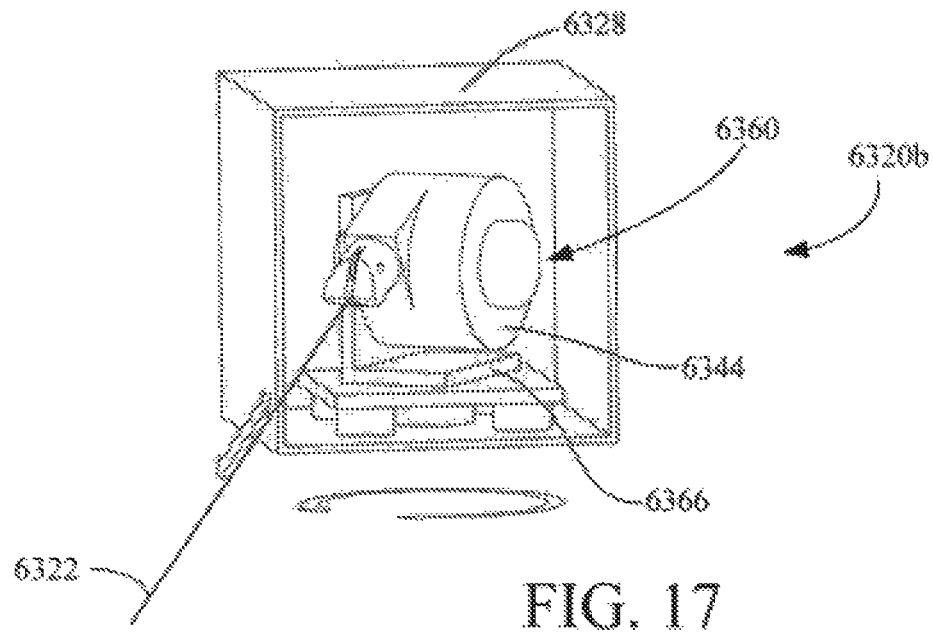
FIG. 17 is an isometric view of the second embodiment of the distance measuring device of FIG. 14 with the string pointing in a second direction.

FIGS. 14-17 illustrate a second embodiment of positional measurement device 6320 henceforth referred to as second positional measurement device 6320b. Second positional measurement device 6320b fits within shell 6328 and also uses retractable cable 6322. Retractable cable 6322 may be retracted onto take-up reel 6343 within drum 6344 by retraction spring 6346. Distance encoder 6360 can connect to take-up reel 6343 to measure cable extension distance. Drum 6344 can pivot around horizontal axis 6362 and the angle of pivot can be read by a vertical sensor or vertical angle encoder 6364 attached to bracket 6366. Bracket 6366 can rotate around vertical axis 6368 and angular movements around that axis can be read by a vertical sensor or horizontal angle encoder 6370. Information from distance encoder 6360, vertical angle encoder 6364, and horizontal angle encoder 6370 provide a 3 dimensional indication of the location of the extendable conveyor 6200 relative to the second positional measurement device 6320b. FIGS. 16 and 17 show the retractable cable 6322 at two different angular positions to illustrate how the second positional measurement device 6320b pivotally moves in response to the retractable cable 6322.

Figure 18:
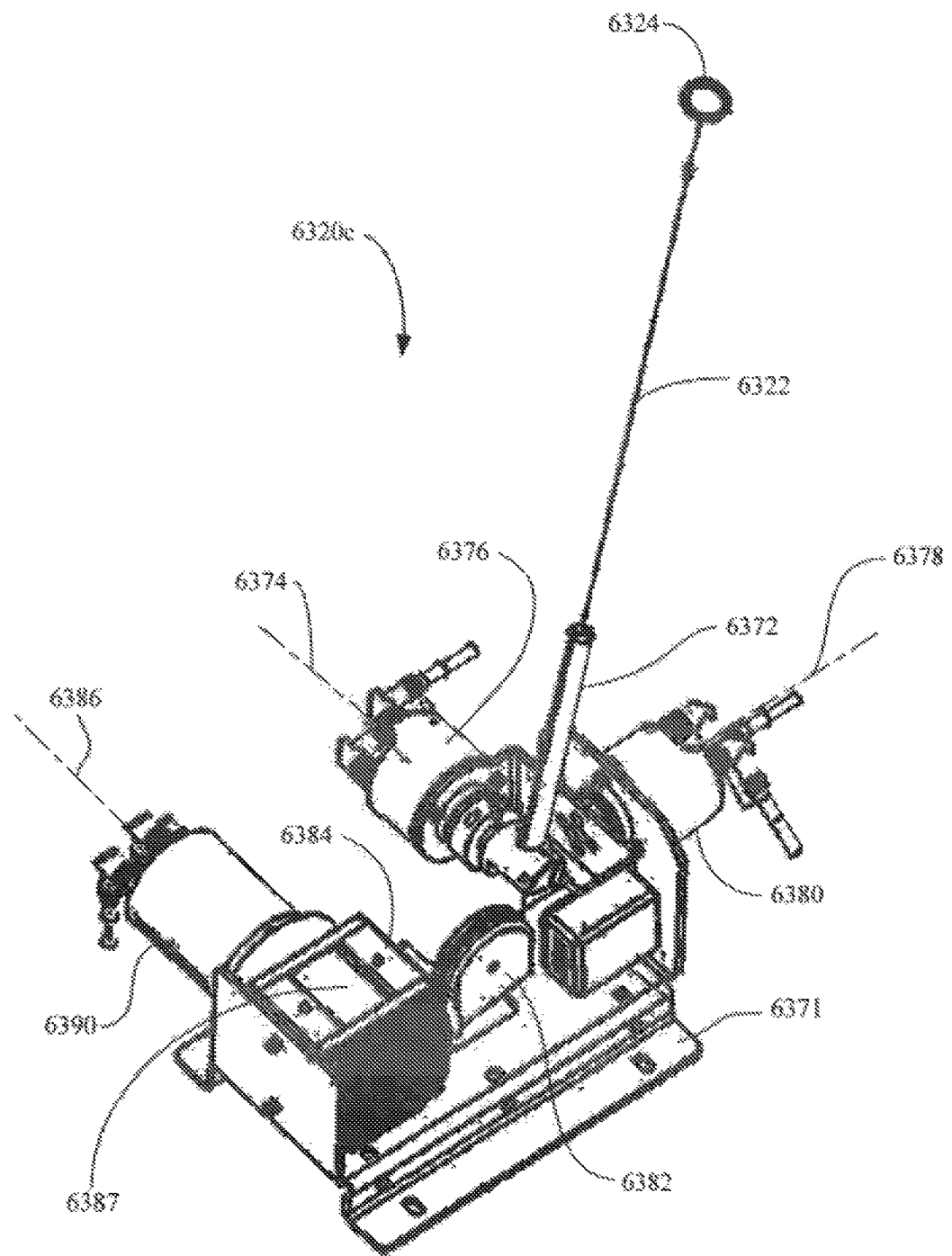
FIG. 18 is an isometric view of the second embodiment of the distance measuring device with the string pointing in a third direction.

FIG. 18 illustrates a third positional measurement device 6320c with bracket 6371 configured to attach to a vertical surface in shell 6328 (not shown). While different in appearance to second positional measurement device 6320b, the third positional measurement device 6320c functions substantially mechanically the same. Third positional measurement device 6320c includes retractable cable 6322 extending from guide tube 6372. Angular position of retractable cable 6322 and guide tube 6372 around a vertical axis 6374 can be measured by vertical radial encoder 6376. Guide tube 6372 can protect the cable when retracted, and can provide leverage to rotate portions of the positional measurement device 6320c. The angular position of retractable cable 6322 and guide tube 6372 around axis 6378 can be measured by horizontal radial encoder 6380. Retractable cable 6322 extends from guide tube 6372 and wraps around pulley 6382 and into cable reel housing 6384 with the reel thereof rotatable around axis 6386. A cable retraction spring 6387 is located within reel housing 6384 and a third radial encoder 6390 is rotatable around axis 6386 to measure extension and retraction distances of the retractable cable 6322. A 3d location of the free end of the retractable cable 6322 can be created by counting or subtracting pulses from the radial encoder 6376, the second radial encoder 6380, and the third radial encoder 6390. All distance and angle encoders can be rotary. In alternate embodiments, the electrical mechanical positional measurement device 6320 can in alternate embodiments be a vision based system such as described in copending patent application U.S. Provisional Patent Application Ser. No. 62/369,435, filed Aug. 31, 2016, entitled "AUTONOMOUS CONTROLS FOR A ROBOTIC CARTON UNLOADER", the entire contents of which are incorporated by reference herein.

Figure 19:
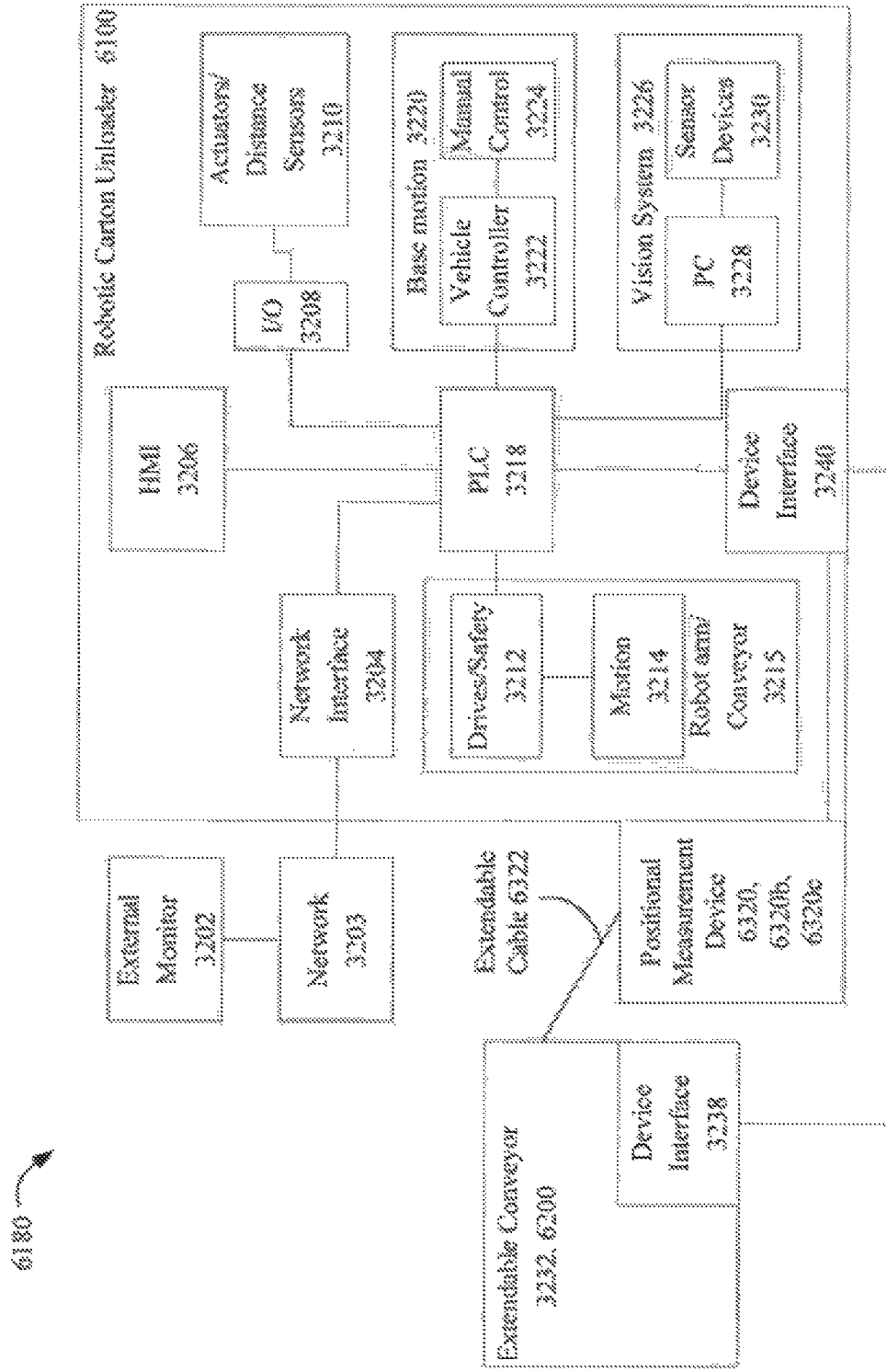
FIG. 19 illustrates an exemplary computing environment for an onboard unloading controller of the robotic carton unloader of FIG. 1, according to one or more embodiments.

In embodiments, the electrical and software functions of the self-aligning interface 6300 may be included as part of the control and visualization system 6180 on the robotic carton unloader 6100 of FIGS. 1 and 19. Alternately, and software functions of the self-aligning interface 6300 may include control and visualization system 6180 on the robotic carton unloader 6100 monitoring forward and reverse commands within the control and visualization system 6180. Control and visualization system 6180 can use the forward and reverse commands to calculate and communicate extension and retraction commands to the extendable conveyor 6200. If desired, portions of the control and visualization system 6180 can be split to be partially on the robotic carton unloader 6100 and the electrical hardware and software functions of the self-aligning interface 6300 can be split between the control and visualization system 6180 and extendable conveyor 6200. Each portion can be slaved to the control and visualization system 6180 on the robotic carton unloader 6100. In embodiments, either or both of the robotic carton unloader 6100 and the extendable conveyor 6200 may be configured to be operated by a human operator, and then may be re-configured back to autonomous operation. The mechanical functions of the self-aligning interface 6300 can be mounted on the robotic carton unloader 6100 and will be described in detail later.

FIG. 19 illustrates exemplary components of a robotic carton unloader 6100 suitable for use in various embodiments. Depending on embodiments listed above, each of the control and visualization system 6180 of the robotic carton unloader 6100 may comprise all or some of an external monitor 3202, a network interface module 3204, an HMI module 3206, an input/output module (I/O module 3208), an actuators/distance sensors module 3210, a robotic arm 6130 and a conveyor system 3215 that includes a drives/safety module 3212 and a motion module 3214, a programmable logic controller (or PLC 3218), a base motion module 3220 that includes a vehicle controller module 3222 and a manual control module 3224, and a vision system 3226 (or visualization system) that may include one or more computing devices 3228 (or "PCs") and sensor devices 3230. In some embodiments, vision system 3226 of the robotic carton unloader 6100 may include a PC 3228 connected to each sensor device 3230. In embodiments in which more than one sensor device 3230 is present on the robotic carton unloader 6100, the PCs 3228 for each sensor device 3230 may be networked together and one of the PC's 3228 may operate as a master PC 3228 receiving data from the other connected PC's 3228, may perform data processing on the received data and its own data (e.g., coordinate transformation, duplicate elimination, error checking, etc.), and may output the combined and processed data from all the PCs 3228 to the PLC 3218. In some embodiments, the network Interface module 3204 may not have a PLC inline between it and the PC 3228, and the PLC 3218 may serve as the Vehicle Controller and/or Drives/Safety system.

The robotic carton unloader 6100 may connect to remote locations or systems with a network interface module 3204 (e.g., a Wi-Fi™ radio, etc.) via a network 3203, such as a local area Wi-Fi™ network. In particular, the network interface module 3204 may enable the robotic carton unloader 6100 to connect to an external monitor 3202. The external monitor 3202 may be anyone of a remote warehouse or distribution center control room, a handheld controller, or a computer, and may provide passive remote viewing through the vision system 3226 of the robotic carton unloader 6100. Alternately, the external monitor 3202 may override the programming inherent in the vision system 3226 and assume active command and control of the robotic carton unloader 6100. Programming for the robotic carton unloader 6100 may also be communicated, operated and debugged through external systems, such as the external monitor 3202. Examples of an external monitor 3202 that assumes command and control may include a remotely located human operator or a remote system, such as a warehouse or distribution server system (i.e., remote device as described above). Exemplary embodiments of using an external monitor 3202 to assume command and control of the robotic carton unloader 6100 may include human or computer intervention in moving the robotic carton unloader 6100, such as from one unloading bay to another, or having the external monitor 3202 assume control of the robotic arm 6130 to remove an item (e.g., box, carton, etc.) that is difficult to unload with autonomous routines. The external monitor 3202 may include any of: a visual monitor, a keyboard, a joystick, an I/O port, a CD reader, a computer, a server, a handheld programming device, or any other device that may be used to perform any part of the above described embodiments.

The robotic carton unloader 6100 may include a human machine interface module 3206 (or HMI module 3206) that may be used to control and/or receive output information for the robot arm and conveyor system 3215 and/or the base motion module 3220. The HMI module 3206 may be used to control (or may itself include) a joystick, a display, and a keypad that may be used for re-programming, over-riding the autonomous control of the machine, and driving the robotic carton unloader 6100 from point to point. The actuators 3210 that may be actuated individually or in any combination by the vision system 3226 and the distance sensors may be used to assist in guiding the robotic carton unloader 6100 into an unloaded area (e.g., a trailer). The I/O module 3208 may connect the actuators and distance sensors 3210 to the PLC 3218. The robotic arm 6130 and conveyor system 3215 may include all components needed to move the arm and/or the conveyor, such as drives/engines and motion protocols or controls. The base motion module 3220 may be the components for moving the entirety of the robotic carton unloader 6100. In other words, the base motion module 3220 may be the components needed to steer the vehicle into and out of unloading areas.

The PLC 3218 that may control the overall electromechanical movements of the robotic carton unloader 6100 or control exemplary functions, such as controlling the robotic arm 6130 or a conveyor system 3215. For example, the PLC 3218 may move the manipulator head of the robotic arm 6130 into position for obtaining items (e.g., boxes, cartons, etc.) from a wall of items. As another example, the PLC 3218 may control the activation, speed, and direction of rotation of kick rollers, and/or various adjustments of a support mechanism configured to move a front-end shelf conveyor (e.g., front-end shelf conveyor 6412). The PLC 3218 and other electronic elements of the vision system 3226 may mount in an electronics box (not shown) located under a conveyor, adjacent to a conveyor, or elsewhere on the robotic carton unloader 6100. The PLC 3218 may operate all or part of the robotic carton unloader 6100 autonomously and may receive positional information from the distance sensors 3210. The I/O module 3208 may connect the actuators and the distance sensors 3210 to the PLC 3218.

The robotic carton unloader 6100 may include a vision system 3226 that comprises sensor devices 3230 (e.g., cameras, microphones, 3D sensors, etc.) and one or more computing device 3228 (referred to as a personal computer or "PC" 3228). The robotic carton unloader 6100 may use the sensor devices 3230 and the one or more PC 3228 of the vision system 3226 to scan in front of the robotic carton unloader 6100 in real time or near real time. The forward scanning may be triggered by the PLC 3218 in response to determining the robotic carton unloader 6100, such as a trigger sent in response to the robotic carton unloader 6100 being in position to begin detecting cartons in an unloading area. The forward scanning capabilities may be used for collision avoidance, sent to the human shape recognition (safety), sizing unloaded area (e.g., the truck or trailer), and for scanning the floor of the unloaded area for loose items (e.g., cartons, boxes, etc.). The 3D capabilities of the vision system 3226 may also provide depth perception, edge recognition, and may create a 3D image of a wall of items (or carton pile). The vision system 3226 may operate alone or in concert with the PLC 3218 to recognize edges, shapes, and the near/far distances of articles in front of the robotic carton unloader 6100. For example the edges and distances of each separate carton in the wall of items may be measured and calculated relative to the robotic carton unloader 6100, and vision system 3226 may operate alone or in concert with the PLC 3218 to may select specific cartons for removal.

In some embodiments, the vision system 3226 may provide the PLC with information such as: specific XYZ coordinate locations of cartons targeted for removal from the unloading area, and one or more movement paths for the robotic arm 6130 or the mobile body of the robotic carton unloader 6100 to travel. The PLC 3218 and the vision system 3226 may work independently or together such as an iterative move and visual check process for carton visualization, initial homing, and motion accuracy checks. The same process may be used during vehicle movement, or during carton removal as an accuracy check. Alternatively, the PLC 3218 may use the move and visualize process as a check to see whether one or more cartons have fallen from the carton pile or repositioned since the last visual check. While various computing devices and/or processors in FIG. 32, such as the PLC 3218, vehicle controller 3222, and PC 3228, have been described separately, in the various embodiments discussed in relation to FIG. 32 and all the other embodiments described herein, the described computing devices and/or processors may be combined and the operations described herein performed by separate computing devices and/or processors may be performed by less computing devices and/or processors, such as a single computing device or processor with different modules performing the operations described herein. As examples, different processors combined on a single circuit board may perform the operations described herein attributed to different computing devices and/or processors, a single processor running multiple threads/modules may perform operations described herein attributed to different computing devices and/or processors, etc.

An extendable conveyor system 6200 can convey articles from the robotic carton unloader 6100 to other portions of a material handling system 3200. As the robotic carton unloader 6100 advances or retreats, any one of the positional measurement device 6320, second positional measurement device 6320b, and third positional measurement device 6320c on the robotic carton unloader 6100 can positionally locate the extendable conveyor 6200. Device interfaces 3238, 3240 respectively of the extendable conveyor 6200 and the robotic carton unloader 6100 can convey angular and distance information or movement commands. For example, PLC 3218 can command an extension motion actuator 3242 on the extendable conveyor 6200 to correspond to movements of the robotic carton unloader 6100 to keep the extendable conveyor system 6200 and the robotic carton unloader 6100 in alignment and in proper spacing. In one embodiment, the device interfaces 3238, 3240 utilize a short range wireless communication protocol such as a Personal Access Network (PAN) protocol. Examples of PAN protocols which may be used in the various embodiments include Bluetooth®, IEEE 802.15.4, and Zigbee® wireless communication protocols and standards. Alternately, the positional measurement device 6320 can be an optical device to sense distances and angles.

As used herein, processors may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

For clarity, the robotic carton unloader 6100 (FIG. 1) is described herein as unloading cartons, which can be corrugated boxes, wooden crates, polymer or resin totes, storage containers, etc. The manipulator head can further engage articles that are products that are shrink-wrapped together or a unitary product. In one or more embodiments, aspects of the present innovation can be extended to other types of manipulator heads that are particularly suited to certain types of containers or products. The manipulator head can employ mechanical gripping devices, electrostatic adhesive surfaces, electromagnetic attraction, etc. Aspects of the present innovation can also be employed on a single conventional articulated arm.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will he further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof; that is said to be incorporated by reference herein, but which conflicts with existing definitions, statements, or other disclosure material set forth herein, will only be incorporated to the extent that no conflict arises between that incorporated material and the existing disclosure material. It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. An interface for interfacing a conveyor to a robotic carton unloader, the conveyor is configured to receive unloaded cartons thereon from the robotic carton unloader during an unloading process, the interface comprising:
    a positional measurement device mounted on the robotic carton unloader and operatively engaged with the conveyor to provide positional information about a location of the conveyor relative to the positional measurement device; and
    a control unit attached to the robotic carton unloader operably connected to the positional measurement device and communicably connected to the conveyor, wherein the control unit utilizes the positional information to control extension and retraction movements of the conveyor such that it moves in unison with the movements of the robotic carton unloader.

2. The interface of claim 1, wherein the positional measurement device further comprises a drum and a bracket, wherein the drum pivots around a horizontal axis and an angle of pivot is read by a vertical angle encoder attached to the bracket, and wherein the bracket rotates around a vertical axis and angular movements around the vertical axis are read by a horizontal angle encoder.

3. The interface of claim 1, wherein the positional measurement device is positioned within a shell having a retractable cable.

4. The interface of claim 3, wherein the retractable cable includes an attachment member at a free end thereof, wherein the attachment member is configured to attach to the extendable conveyor.

5. The interface of claim 4, wherein at least a portion of the attachment member is arcuate.

6. An interface for interfacing an unloader conveyor mounted on a robotic carton unloader to an extendable conveyor, the extendable conveyor is configured to receive cartons being unloaded by the robotic carton unloader, the interface comprising:
a positional measurement device mounted on the robotic carton unloader, wherein the positional measurement device is engageable with the extendable conveyor to provide positional information about the extendable conveyor relative to the positional measurement device;
a carton alignment interface comprising rear guides attached to the robotic carton unloader, the rear guides configured to guide unloaded cartons exiting the unloader conveyor onto the extendable conveyor; and
a control unit, comprising a processor, wherein the control unit is operatively attached to the robotic carton unloader and to the positional measurement device and wherein the control unit is further communicably connected to the extendable conveyor to calculate and coordinate movements of the extendable conveyor relative to movements of the robotic carton unloader so as to position the extendable conveyor to receive the unloaded cartons off of the unloader conveyor.

7. The interface of claim 6, wherein the unloader conveyor comprises a front conveyor portion, a center conveyor portion, and a rear conveyor portion, wherein the rear conveyor portion extends rearwards to define a rear of the robotic carton unloader and wherein the rear conveyor portion is configured to interface with the extendable conveyor.

8. The interface of claim 6, wherein the positional measurement device further comprises a shield or shell that attaches under the rear conveyor portion to protect the positional measurement device.

9. The interface of claim 6, wherein the positional measurement device further comprises a retractable cable, a take-up reel, and a retraction spring, wherein the retractable cable wraps around the take-up reel, wherein the take-up reel is configured to constantly retract the retractable cable, and wherein the retraction spring is configured to retract the retractable cable onto the take-up reel.

10. The interface of claim 6, wherein the positional measurement device further comprises a vertical scale on the inside of a shield or shell.

11. An interface for interfacing a conveyor to a robotic carton unloader, the interface comprising:
a positional measurement device mounted on the robotic carton unloader and operatively engaged with the conveyor to provide positional information about a location of the conveyor relative to the positional measurement device;
one or more device interfaces positioned on at least one of the conveyor and the robotic carton unloader to convey at least one of the positional information of the conveyor, an angular information of the conveyor, and a distance information of the conveyor;
a control unit attached to the robotic carton unloader operably connected to the positional measurement device and communicably connected to the conveyor, wherein the control unit utilizes at least one of the positional information of the conveyor, the angular information of the conveyor, and the distance information of the conveyor to issue movement commands through the one or more device interfaces to an extension motion actuator on the conveyor in order to keep the conveyor and the robotic carton unloader substantially aligned.

12. The self-aligning interface of claim 11, wherein the positional measurement device comprises an electrical mechanical positional measurement device.

13. The self-aligning interface of claim 11, wherein a portion of the control unit is on the conveyor.

14. The self-aligning interface of claim 11, wherein the control unit communicates with the conveyor without a physical connection.

15. A method for interfacing an unloader conveyor mounted on a robotic carton unloader to an extendable conveyor, the method comprising:
receiving, by the unloader conveyor, one or more cartons unloaded by the robotic carton unloader;
computing, by a positional measurement device, a positional information of the extendable conveyor, an angular information of the extendable conveyor, and a distance information of the extendable conveyor;
providing three dimensional (3D) information of a location of the extendable conveyor with respect to the positional measurement device based on the computing; and
coordinating movements of the extendable conveyor relative to movements of the robotic carton unloader based on the three dimensional (3D) information.

16. The method of claim 15, wherein coordinating the movements of the extendable conveyor further comprising:
controlling extension and retraction movements of the extendable conveyor to move in unison with the forward and reverse movements of the robotic carton unloader.

17. The method claim 15, wherein computing by the positional measurement device further comprising:
measuring angular positions of a retractable cable on both horizontal and vertical axes using a first radial encoder and second radial encoder;
measuring extension and retraction distances of the retractable cable using a third radial encoder; and
creating the three dimensional (3D) information of location of a free end of the retractable cable by counting or subtracting pulses from the first radial encoder, the second radial encoder, and the third radial encoder.

* * * * *